US012700335B2

(12) United States Patent
Palm

(10) Patent No.: US 12,700,335 B2
(45) **Date of Patent: *Aug. 4, 2026**

(54) HEAD-UP DISPLAY WITH REDUCED MASKING

(71) Applicant: Continental Automotive Technologies GmbH, Hannover (DE)

(72) Inventor: Nils Palm, Babenhausen (DE)

(73) Assignee: Continental Automotive Technologies GmbH, Hannover (DE)

( * ) Notice: Subject to any disclaimer, the term of this patent is extended or adjusted under 35 U.S.C. 154(b) by 202 days.

This patent is subject to a terminal disclaimer.

(21) Appl. No.: 18/688,473

(22) PCT Filed: Aug. 18, 2022

(86) PCT No.: PCT/DE2022/200189
§ 371 (c)(1),
(2) Date: Mar. 1, 2024

(87) PCT Pub. No.: WO2023/030593
PCT Pub. Date: Mar. 9, 2023

(65) Prior Publication Data

US 2024/0363041 A1 Oct. 31, 2024

(30) Foreign Application Priority Data

Sep. 1, 2021 (DE) ..................... 10 2021 209 616.6
Apr. 26, 2022 (DE) ..................... 10 2022 204 033.3

(51) Int. Cl.
*G09G 3/00* (2006.01)

(52) U.S. Cl.
CPC ..... *G09G 3/001* (2013.01); *G09G 2340/0471* (2013.01); *G09G 2354/00* (2013.01); *G09G 2380/10* (2013.01)

(58) Field of Classification Search
CPC ........... G09G 3/001; G09G 2340/0471; G09G 2354/00; G09G 2380/10; G09G 2360/16;
(Continued)

(56) References Cited

U.S. PATENT DOCUMENTS 9,418,408 B1 * 8/2016 Thompson ............... G09G 5/00
2011/0279355 A1 11/2011 Yasue et al.
(Continued)

FOREIGN PATENT DOCUMENTS

CN 110554497 A * 12/2019 ......... G02B 27/0101
DE 102012204303 A1 9/2013
(Continued)

OTHER PUBLICATIONS

Office Action of related U.S. Appl. No. 18/688,497, dated Oct. 7, 2025.

(Continued)

*Primary Examiner* — Yingchun He
(74) *Attorney, Agent, or Firm* — COZEN O'CONNOR

(57) ABSTRACT

The present disclosure relates to a method, a computer program comprising instructions and a device for reducing masking by a virtual image of a head-up display of a transport. The disclosure additionally relates to a head-up display for a transport in which such a method or such a device is used. In a first step, a horizon is determined. Afterward, an image to be displayed is subdivided into a plurality of partial areas. In this case, the partial areas are rectangular and their vertical extent varies over the area of the image to be displayed. For the individual partial areas, masking areas are determined and checking is carried out to ascertain whether the determined masking area exceeds a permissible size for at least one of the partial areas. If this is the case, a warning signal is output. Finally, at least one
(Continued)

measure for reducing the masking is implemented in response to the warning signal.

11 Claims, 5 Drawing Sheets

(58) Field of Classification Search
CPC ............ G09G 3/002; G02B 2027/0183; G02B 27/01; G06F 3/011; G06F 3/013; G08G 1/166
See application file for complete search history.

(56) References Cited

U.S. PATENT DOCUMENTS

| | | | |
|---|---|---|---|
| 2013/0265232 | A1 | 10/2013 | Yun et al. |
| 2016/0311323 | A1 | 10/2016 | Lee et al. |
| 2017/0187963 | A1 | 6/2017 | Lee et al. |
| 2017/0269370 | A1 | 9/2017 | Sato et al. |
| 2018/0003964 | A1 | 1/2018 | Tatsuno |
| 2018/0218713 | A1 | 8/2018 | Kusanagi et al. |
| 2018/0257570 | A1 | 9/2018 | Kaino et al. |
| 2019/0381885 | A1 | 12/2019 | Naruse |
| 2020/0019782 | A1 | 1/2020 | Narayanaswami et al. |
| 2020/0065979 | A1 | 2/2020 | Peng et al. |
| 2021/0271077 | A1 | 9/2021 | Huber |

FOREIGN PATENT DOCUMENTS

| | | | | | |
|---|---|---|---|---|---|
| DE | 102015215180 | A1 | | 2/2017 | |
| DE | 102016223908 | A1 | | 6/2018 | |
| DE | 112018000948 | T5 | | 12/2019 | |
| DE | 102019207952 | B3 | | 8/2020 | |
| EP | 3028122 | A1 | | 6/2016 | |
| EP | 3304886 | A1 | | 4/2018 | |
| JP | 2010177788 | A | | 8/2010 | |
| JP | 2020083280 | A | * | 6/2020 | |
| KR | 20170096609 | A | * | 8/2017 | ............ B60K 35/00 |
| WO | 2015015811 | A1 | | 2/2015 | |
| WO | 2016194296 | A1 | | 12/2016 | |

OTHER PUBLICATIONS

Non-Final Office Action mailed Mar. 14, 2025 from related U.S. Appl. No. 18/688,497.
International Search Report and Written Opinion dated Nov. 22, 2022 from related International patent application No. PCT/DE2022/200190.
International Search Report and Written Opinion dated Nov. 18, 2022 from corresponding International patent application No. PCT/DE2022/200189.
Notice of Allowance dated Mar. 29, 2022 from related German patent application No. 10 2021 209 616.6.
Office Action of U.S. Appl. No. 18/688,497, dated Aug. 21, 2025.
Office Action of related U.S. Appl. No. 18/688,497, dated Jan. 16, 2026.

* cited by examiner

HEAD-UP DISPLAY WITH REDUCED MASKING

CROSS REFERENCE TO RELATED APPLICATIONS

This US patent application claims the benefit of PCT patent application No. PCT/DE2022/200189, filed Aug. 18, 2022, which claims the benefit of German patent application No. 10 2022 204 033.3, filed April 2022, and the benefit of German patent application No. 10 2021 209 616.6, filed Sep. 1, 2021, all of which are hereby incorporated by reference.

TECHNICAL FIELD

The present disclosure relates to a method, a computer program comprising instructions and a device for reducing masking by a virtual image of a head-up display of a transport. The disclosure additionally relates to a head-up display for a transport in which such a method or such a device is used.

BACKGROUND

A head-up display, also referred to as HUD, is understood to mean a display system in which the observer may maintain their viewing direction since the contents to be represented are inserted into their field of view. While such systems were originally used primarily in the aviation sector due to their complexity and costs, they are now also being used in large-scale production in the automotive sector.

Head-up displays generally consist of an image generator, an optics unit, and a mirror unit. The image generator generates the image. The optics unit directs the image onto the mirror unit. The image generator is often also referred to as an imaging unit or PGU (picture generating unit). The mirror unit is a partially reflecting, light-transmissive pane. The observer thus sees the contents represented by the image generator as a virtual image and at the same time the real world behind the pane. In the automotive sector, the windshield is often used as mirror unit, and its curved shape must be taken into account in the representation. Due to the interaction between the optics unit and the mirror unit, the virtual image is an enlarged representation of the image generated by the image generator.

For head-up displays, at the present time use is usually made of a liquid crystal display (LCD) with backlighting for the imaging unit. Displays based on OLED technology (OLED: Organic Light Emitting Diode) and DMD technology (Digital Micromirror Device) are used as well.

Against this background, DE 10 2015 215 180 A1 describes a head-up display for a vehicle. The head-up display comprises a display device for emitting light with an image generating unit, and an image control unit for controlling the image generating unit. In this case, a reduced brightness is set in regions of the display device in dependence on the viewing direction of a user. This makes it possible to reduce the energy expenditure during image generation. However, it does not prevent the user from being dazzled if the ambient brightness is low and the regions of the display device that are not reduced in terms of their brightness are set to be too bright.

In the case of large and bright head-up displays that cover a large region of the driver's field of view, the problem of masking arises in addition to the problem of dazzling. It is necessary to avoid a situation in which relevant objects such as e.g. cyclists, pedestrians, animals or a soccer ball rolling onto the road may be masked by a bright region in the virtual image of the head-up display and may therefore not be perceived by the driver.

A general approach for solving this problem area consists in avoiding relatively large regions on the LCD display that are bright over the whole area, and giving preference to the virtual image being constructed from thin lines, instead of using filled areas.

In order to monitor whether bright regions may result in masking, the virtual image may be decomposed into small rectangles, so-called tiles, which are each checked for their transparency. In this case, the transparency serves as a measure of the masking area of the tile. The checking should take into consideration the fact that the transparency is permitted to have a magnitude only one quarter that of the maximum permissible masking area. This takes account of the fact that the areally bright region could be divided among four tiles in the worst case.

SUMMARY

It is an object of the disclosure to provide improved solutions for reducing masking by a virtual image of a head-up display.

This object is achieved by a method having the features of claim 1, by a computer program comprising instructions having the features of claim 9 and by a device having the features of claim 10. The dependent claims relate to configurations of the disclosure.

According to a first aspect of the disclosure, a method for reducing masking by a virtual image of a head-up display of a transport comprises the steps of subdividing an image to be displayed into a plurality of partial areas, wherein the partial areas are rectangular and their vertical extent varies over the area of the image to be displayed; determining masking areas for the individual partial areas; and outputting a warning signal if the determined masking area exceeds a permissible size for at least one of the partial areas.

According to a further aspect of the disclosure, a computer program comprises instructions which, when executed by a computer, cause the computer to carry out the following steps for reducing masking by a virtual image of a head-up display of a transport by subdividing an image to be displayed into a plurality of partial areas, wherein the partial areas are rectangular and their vertical extent varies over the area of the image to be displayed; determining masking areas for the individual partial areas; and outputting a warning signal if the determined masking area exceeds a permissible size for at least one of the partial areas.

The term computer should be understood in the broad sense in this case. In particular, it also includes control units, controllers, embedded systems and other processor-based data processing devices.

The computer program can be provided for electronic retrieval or may be stored on a computer-readable storage medium, for example.

According to a further aspect of the disclosure, a device for reducing masking by a virtual image of a head-up display of a transport comprises a subdividing module for subdividing an image to be displayed into a plurality of partial areas, wherein the partial areas are rectangular and their vertical extent varies over the area of the image to be displayed; a processing module for determining masking areas for the individual partial areas; and a warning module for outputting a warning signal if the determined masking area exceeds a permissible size for at least one of the partial areas.

In the case of the solution according to the disclosure, the image to be displayed is decomposed into rectangular tiles whose vertical extent varies within the image. The smaller an object overlaid by the image to be displayed is perceived by the observer, the smaller, too, the tiles in the respective region. Since the perceived size of an object varies with the distance of the object, the tiles are small in those regions of the image which overlay objects far away. At upper and lower edges of the image, the perceived objects such as vehicles directly ahead or vehicles ahead on a neighboring lane at the lower image edge, or such as overhanging branches at the upper image edge, are closer; therefore, the tiles may also be larger in these regions. In contrast to the subdivision of the image to be displayed into rectangles of the same size, the maximum size of the bright area that is still tolerable varies in magnitude in the different image regions. The subdividing axes run horizontally and vertically through the field of view, but are at varying distances from one another. The subdivision depends on the distance from the horizon, and thus approximately corresponds to the size relationships of the perceived image. Rectangular areas are easy to process and calculate since the image data are usually present in a manner divided into lines and columns, i.e. according to a rectangular scheme. If only the vertical extent of the partial areas varies, then during processing in each case a different number of lines may be combined for joint processing of identical type, while the number of columns of a partial area does not change. The inventor of the present disclosure has discovered that adapting the size of the partial areas in terms of height is sufficient to achieve a safe reduction of masking. In this case, a finer division is provided in the region of the horizon since this region has been found to be the most critical region for driving safety with regard to masking. The warning signal may be an optical or acoustic warning, for example. The warning signal is used to switch off the image output of the head-up display. In this regard, the display element is switched completely to "nontransparent" and/or the backlighting of the display element is completely switched off. This increases safety.

According to one aspect of the disclosure, when determining the masking areas, a transparency of the partial areas is considered as a measure of the masking area. The transparency is an easily determinable measure of the magnitude of the percentage proportion of the masked area within the respective partial area.

According to one aspect of the disclosure, before outputting a warning signal, checking is carried out to ascertain whether the determined masking area exceeds a permissible size for two or more adjacent partial areas. In the worst case, the areally bright region that results in masking is shared among four partial areas. The permissible size of the masking area within a partial area is chosen to take account of this situation. However, if checking of an adjacent partial area reveals that there the permissible size of the masking area is not exceeded and a tolerable masking is present overall, the outputting of a warning signal may be dispensed with.

According to one aspect of the disclosure, the partial areas have a decreasing vertical extent from an upper and/or a lower edge region of the image to be displayed to the horizon. The sizes of the image perceived by the observer follow the horizon, i.e. objects are perceived all the smaller the nearer to the horizon they are situated, and all the larger the further above or below the horizon they are situated. Accordingly, the vertical extent of the rectangular partial areas is also all the smaller the nearer to the horizon they are situated. Objects situated below the horizon line are situated all the nearer to the transport, the further their distance downward from the horizon. They are therefore perceived larger than objects situated in the vicinity of the horizon line. Objects situated above the horizon line are either very far away from the means of transport, and appear so small that they are generally hardly perceived or not perceived at all. Alternatively, the objects situated above the horizon line are less distant than the horizon, for example birds flying in front of the transport, overhanging branches, sign gantries or else transport that are close ahead or situated in adjacent lanes. Such objects are likewise perceived larger than objects situated in the vicinity of the horizon. The disclosure therefore provides for the vertical extent of the partial areas both below and above the horizon line to increase with increasing distance from the horizon line.

According to one aspect of the disclosure, determining the horizon is carried out by determining an inclination of the transport. The location of the horizon may easily be determined from the inclination of the transport, which may be detected e.g. by gyroscope sensors.

According to one aspect of the disclosure, the horizon line is assumed to be a fixedly predefined horizontal line of the image data of the image to be displayed, and a vertical displacement of the entire image content to be represented is performed depending on a detected vertical eye position of a user. This simplifies the method steps to be carried out since a fixedly predefined grid is always employed. This obviates the need for example for determining a current horizon line in the image data of the image to be displayed, correspondingly ascertaining or displacing the horizontal boundaries of the partial areas in the vertical direction in a manner adapted to the position of a current horizontal line, etc. An adaptation of the horizon line to the vertical eye position of the observer is effected by the entire represented image being displaced upward or downward, with the result that the line of the image that is fixedly predefined as the horizontal line corresponds to the actual horizon. The eye position of the observer is detected by an interior camera, for example. Such interior cameras and evaluation units therefor are present anyway in many transport. Consequently, using the information ascertained by them requires no or only little additional outlay. Actuators for adapting the vertical position of the represented image are usually present as well.

According to one aspect of the disclosure, at least one measure for reducing the masking is implemented in response to the warning signal. By way of example, at least one image element that causes the masking may be displaced. What may be achieved by displacing the image element into a partial area situated somewhat further in the direction of the image edge is that the resulting masking area no longer exceeds the permissible size. Alternatively or additionally, the area masked by the image element may be reduced. For this purpose, e.g. the image element may be constructed from thin lines or merely be represented as a contour.

According to one aspect of the disclosure, a display of image elements in the region of the horizon is prevented. In order to further increase safety, it is advantageous if the horizon per se is totally omitted from the display of image elements. Particularly at high speed, for example an end of a backup may appear very small and easily be masked.

A method according to the disclosure or a device according to the disclosure is used in a head-up display for a transport, e.g. in a head-up display for a motor vehicle. Such a head-up display is distinguished by increased safety for the driver since masking of relevant objects in the driver's field of view is reduced or completely avoided.

According to one aspect of the disclosure, the device according to the disclosure is arranged on a substrate of the display element. At this place there is generally little space available, and owing to difficult heat dissipation conditions it is not possible for relatively large computation operation-requiring elements to be arranged there. However, the method according to the disclosure now manages with so few and uncomplicated method steps that not only is it able to be realized with a small space requirement but it also generates little process heat that would need to be dissipated. The disclosure thus makes it possible for the first time to arrange masking recognition and reduction close to the image-generating element in this way, namely on the substrate of the display element. Short conduction paths are thus made possible, which reduces negative effects resulting from external interference influences.

BRIEF DESCRIPTION OF THE FIGURES

Further features of the present disclosure will become apparent from the following description and the appended claims in conjunction with the figures.

DETAILED DESCRIPTION

For a better understanding of the principles of the present disclosure, embodiments of the disclosure are explained below in greater detail with reference to the figures. The same reference signs are used for identical or functionally identical elements in the figures and are not necessarily described again for each figure. It goes without saying that the disclosure is not restricted to the embodiments illustrated and that the features described can also be combined or modified without departing from the scope of protection of the disclosure as defined in the appended claims.

Figure 1:
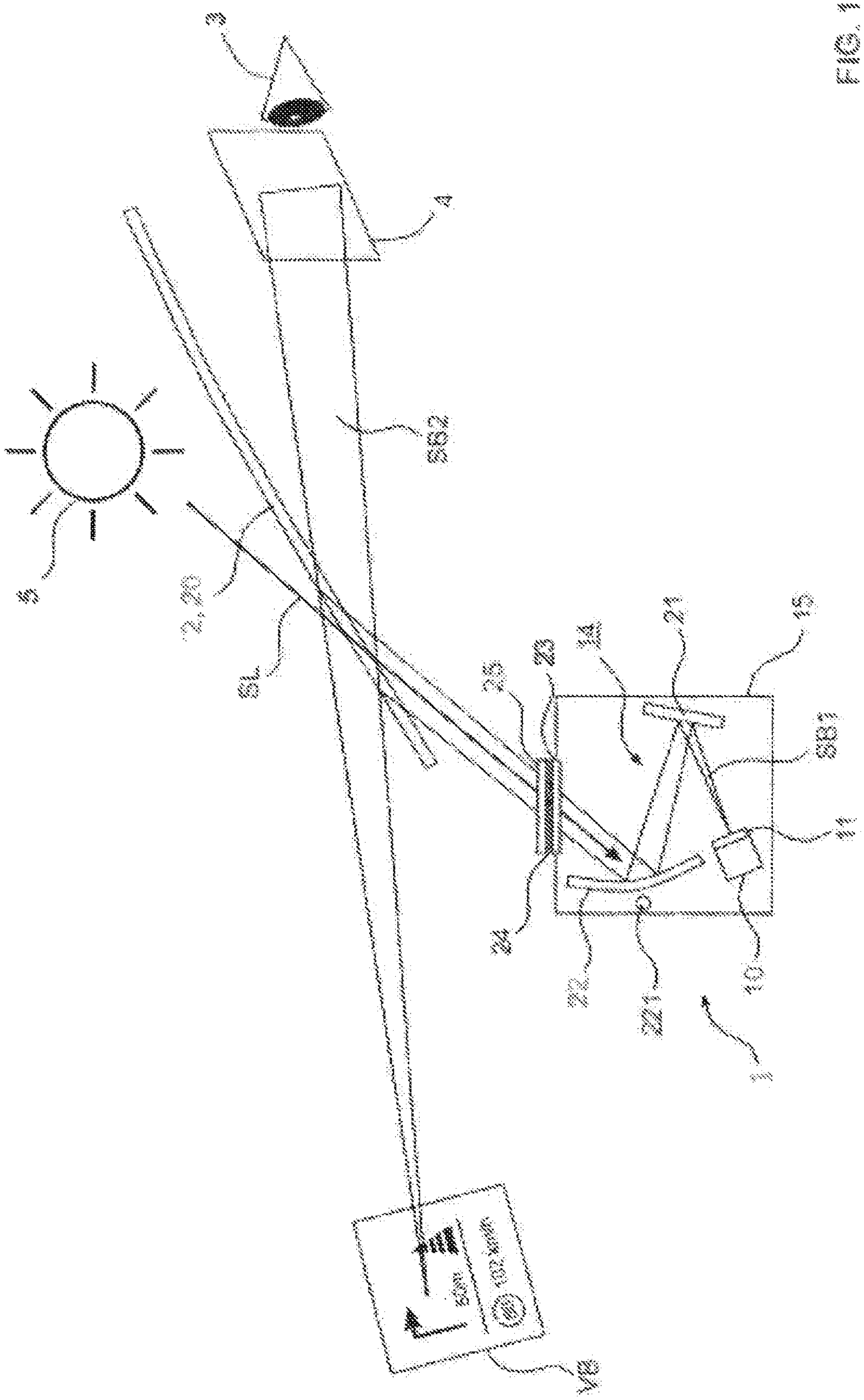
FIG. 1 schematically shows a head-up display according to the prior art for a motor vehicle.

FIG. 1 shows a schematic diagram of a head-up display for a motor vehicle. The head-up display has a display device 1 with an imaging unit 10 and an optics unit 14. A beam SB1 emanates from a display element 11 and is reflected by a folding mirror 21 onto a curved mirror 22 that reflects said beam in the direction of a mirror unit 2. The mirror unit 2 is illustrated here as a windshield 20 of the motor vehicle. From there, the beam SB2 travels in the direction of an eye of an observer 3.

The observer 3 sees a virtual image VB that is located outside the motor vehicle above the engine hood or even in front of the motor vehicle. Due to the interaction between the optics unit 14 and the mirror unit 2, the virtual image VB is an enlarged representation of the image displayed by the display element 11. A speed limit, the current vehicle speed and navigation instructions are symbolically represented here. As long as the eye of the observer 3 is located within an eyebox 4, indicated by a rectangle, all elements of the virtual image VB are visible to the observer 3. If the eye of the observer 3 is located outside of the eyebox 4, the virtual image VB is only partially visible to the observer 3 or not at all. The larger the eyebox 4, the less restricted the observer is when choosing their seating position.

The curvature of the curved mirror 22 is adapted to the curvature of the windshield 20 and ensures that the image distortion is stable over the entire eyebox 4. The curved mirror 22 is rotatably mounted by a mounting 221. The rotation of the curved mirror 22 that this allows makes it possible to displace the eyebox 4 and thus to adapt the position of the eyebox 4 to the position of the observer 3. The folding mirror 21 serves to ensure that the path traveled by the beam SB1 between the display element 11 and the curved mirror 22 is long and at the same time the optics unit 14 is nevertheless compact. The imaging unit 10 and the optics unit 14 are separated from the environment by a housing 15 having a transparent cover plate 23. The optical elements of the optics unit 14 are thus protected, for example, against dust inside the vehicle. An optical film or a polarizer 24 may furthermore be located on the cover plate 23. The display element 11 is typically polarized, and the mirror unit 2 acts like an analyzer. The purpose of the polarizer 24 is therefore to influence the polarization in order to achieve uniform visibility of the useful light. A cover assembly 25 arranged on the cover plate 23 serves to reliably absorb the light reflected via the boundary of the cover plate 23 so that the observer is not dazzled. In addition to the sunlight SL, the light from another stray light source 5 may also reach the display element 11. In combination with a polarization filter, the polarizer 24 may additionally also be used to reduce incident sunlight SL.

Figure 2:
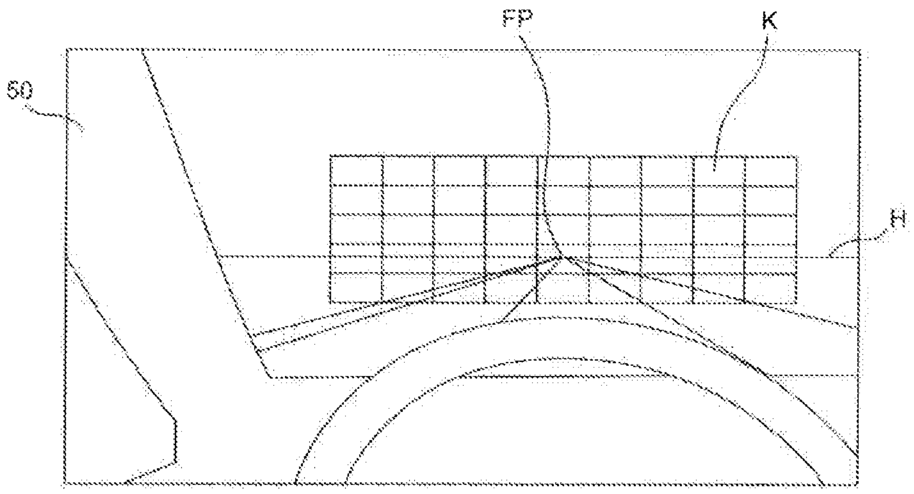
FIG. 2 shows a subdivision of an image to be displayed into rectangular partial areas.

FIG. 2 shows a subdivision of an image to be displayed into rectangular partial areas K. The illustration shows the resulting virtual image VB and the partial areas K from the viewpoint of the driver of a transport 50. The partial areas K are rectangles of uniform size. It is readily discernible that the partial areas K in the region of the vanishing point FP or the horizon H cover a larger perceived region of the surroundings than partial areas K at the edge of the image. By way of example, the partial area K at the vanishing point FP extends over the entire width of the road, while the partial areas K at the lower edge each cover only a fraction of the road.

Figure 3:
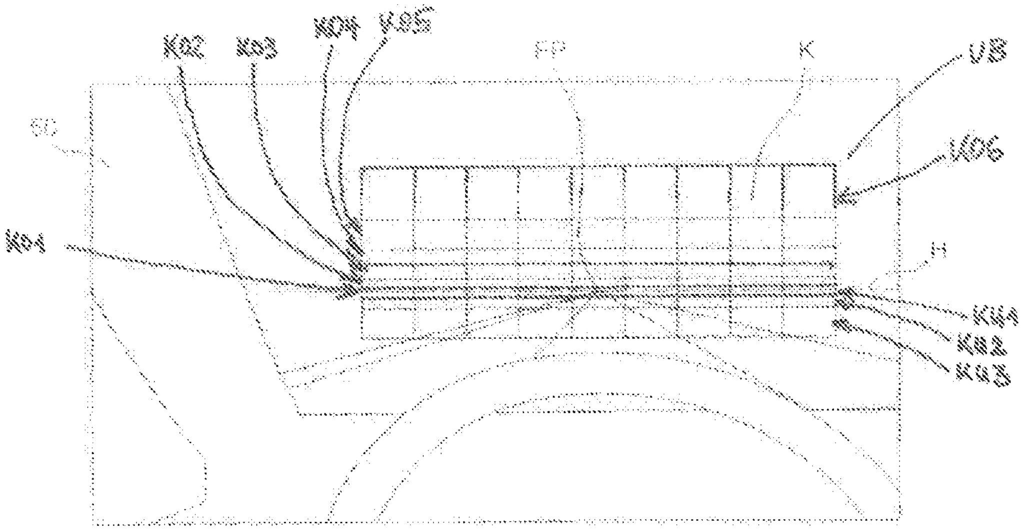
FIG. 3 shows a subdivision of an image to be displayed into rectangular partial areas with a varying vertical extent.

FIG. 3 shows a subdivision of an image to be displayed into rectangular partial areas K, KO1-KO5, KU1-KU3 with a varying vertical extent. The illustration once again shows the resulting virtual image VB and the partial areas K, KO1-KO5, KU1-KU3 from the viewpoint of the driver of a transport 50. The partial areas KO5, KO4, KO3, KO2, KO1 have a decreasing height from the upper edge of the image to the horizon H. Their vertical extent thus decreases as viewed from top to bottom. The partial areas KU3, KU2, KU1 have a decreasing height from the lower edge of the image toward the horizon H. Their vertical extent thus increases as viewed from top to bottom. Since the perceived size of an object varies with the distance of the object, the partial areas K, KO1-KO5, KU1-KU3 are small in those regions of the image which overlay objects far away. In the upper and lower regions of the image, the perceived objects are nearer; therefore, the uppermost and lowermost partial areas KO5 and KU3, respectively, may also be larger than the partial areas KO4-KO1 and KU2-KU1 respectively located nearer to the horizon H. In addition, in an alternative variant, the region directly around the horizon, here the partial areas KO1 and KU1, is totally omitted from the display of image elements. The partial areas KOn where n=1 . . . 5 and KUn where n=1 . . . 3 have a rectangular shape, and partial areas situated next to one another horizontally, i.e. those having the same value for n, have the same width and the same height. The partial areas KO6 at the upper edge of the image have an approximately square shape and are the partial areas having the largest area in this representation. A variant that is not illustrated here provides for at least the partial areas K which are situated at the outermost left and right edges additionally to have a larger horizontal extent than the partial areas situated further inward. Here, too, it is preferably possible to dispense with a complex determination of the exact location of the vanishing point FP and, dependent on that, a variable determination of the masking.

Figure 4:
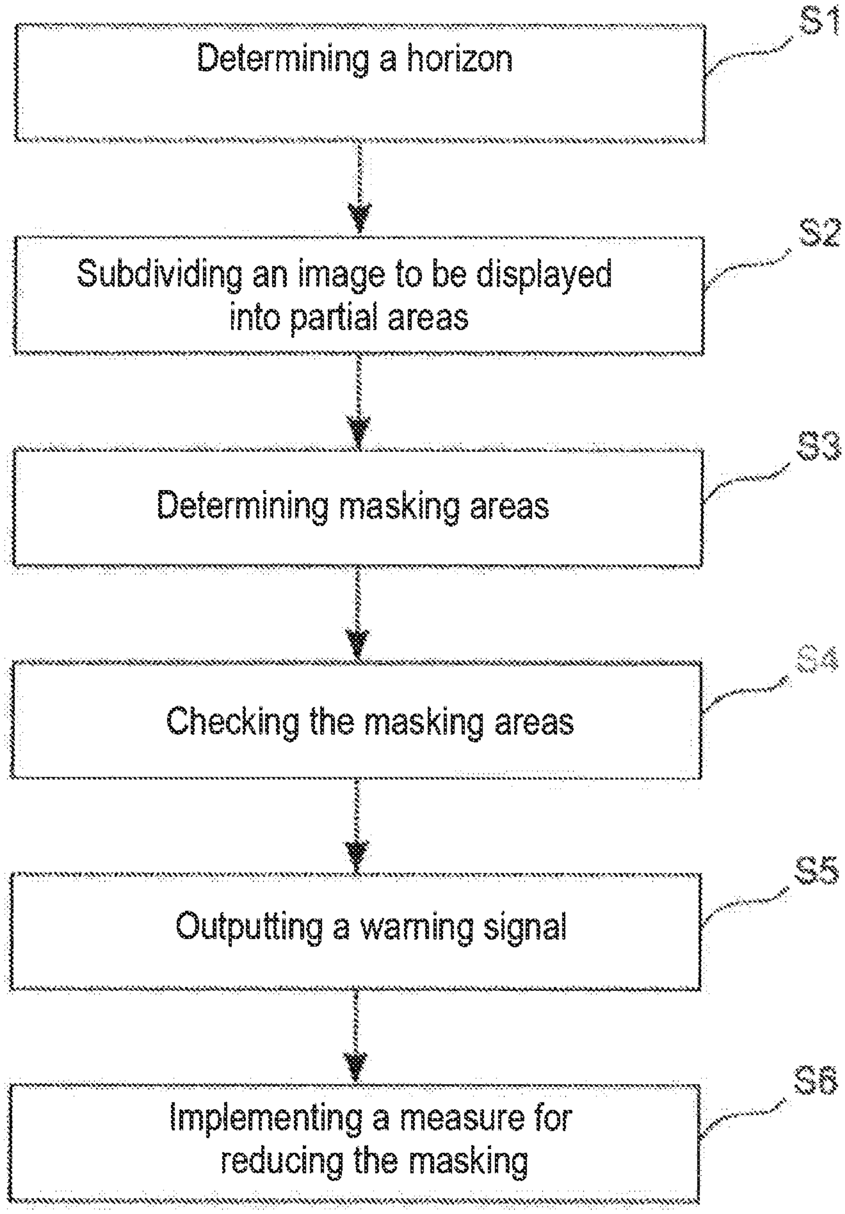
FIG. 4 schematically shows a method for reducing masking by a virtual image of a head-up display of a transport.

FIG. 4 schematically shows a method for reducing masking by a virtual image of a head-up display of a transport. In a first step, a horizon is determined S1. For the purpose of determining S1 the horizon, an inclination of the transport may be determined beforehand. Alternatively, on the other hand, a vertical eye position of an observer may be determined. Depending on the determined horizon, the vertical position of the entire image to be displayed is adapted, by tilting the curved mirror 22 about the mounting 221 thereof. Afterward, an image to be displayed is subdivided S2 into a plurality of partial areas. In this case, the partial areas are rectangular and their vertical extent varies over the area of the image to be displayed. The partial areas have a decreasing vertical extent from an upper or a lower edge region of the image to be displayed toward the horizon. A fixedly predefined line of the image data of the image to be displayed is used as the horizon. Masking areas are determined S3 for the individual partial areas. In this case, e.g. a transparency of the partial areas may be considered as a measure of the masking area. Finally, checking S4 is carried out to ascertain whether the determined masking area exceeds a permissible size for at least one of the partial areas. If this is the case, a warning signal is output S5. Before outputting a warning signal, optionally checking can be carried out to ascertain whether the determined masking area exceeds a permissible size for two or more adjacent partial areas. Finally, at least one measure for reducing the masking is implemented S6 in response to the warning signal. In this case a display of image elements in the region of the horizon is prevented.

Figure 5:
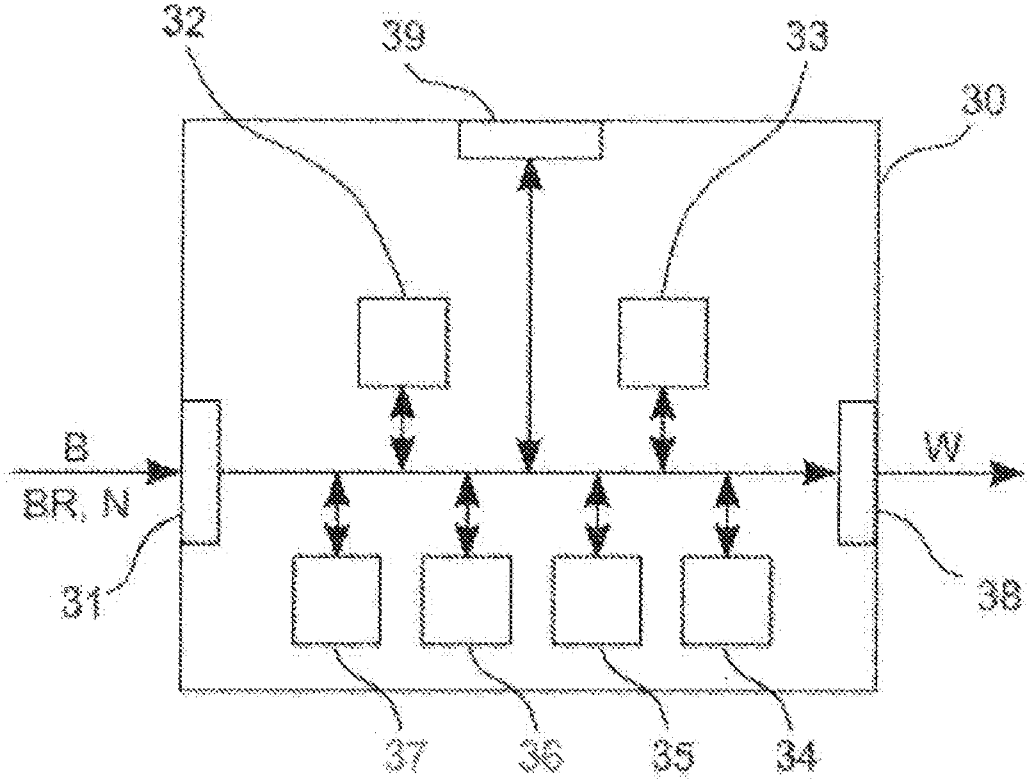
FIG. 5 schematically shows a first embodiment of a device for reducing masking by a virtual image of a head-up display of a transport.

FIG. 5 shows a simplified schematic illustration of a first embodiment of a device 30 for reducing masking by a virtual image of a head-up display of a transport. The device 30 has an input 31, via which an image B to be displayed is received. Information N, BR may additionally be received via the input 31, from which information an evaluation module 32 may determine a horizon. For the purpose of determining the horizon, e.g. an inclination N of the transport may be evaluated. For the purpose of determining the horizon, a vertical eye position BR of an observer may also be evaluated. A subdividing module 33 is configured to subdivide the image B to be displayed into a plurality of partial areas. In this case, the partial areas are rectangular and their vertical extent varies over the area of the image B to be displayed. The partial areas have a decreasing size from an upper and/or lower edge region of the image B to be displayed to the horizon. A processing module 34 is configured to determine masking areas for the individual partial areas. In this case, the processing module 34 may consider e.g. a transparency of the partial areas as a measure of the masking area. The processing module 34 is additionally configured to check whether the determined masking area exceeds a permissible size for at least one of the partial areas. A warning module 35 is configured to output a warning signal W if this is the case. Before outputting a warning signal W, the processing module 34 may optionally check whether the determined masking area exceeds a permissible size for two or more adjacent partial areas. The warning signal W may be output via an output 38 of the device 30, e.g. in order to initiate at least one measure for reducing the masking. In this case a display of image elements in the region of the horizon is prevented.

The evaluation module 32, the subdividing module 33, the processing module 34 and the warning module 35 can be controlled by a control module 36. If appropriate, settings of the evaluation module 32, of the subdividing module 33, of the processing module 34, of the warning module 35, or of the control module 36 can be changed via a user interface 39. The data that accrue in the device 30 may be stored in a memory 37 of the device 30 if necessary, for example for later evaluation or for use by the components of the device 30. The evaluation module 32, the subdividing module 33, the processing module 34, the warning module 35 and the control module 36 may be realized as dedicated hardware, for example as integrated circuits. Of course, however, they may also be implemented partially or completely in combination or as software that runs on a suitable processor, for example on a GPU or a CPU. The input 31 and the output 38 may be implemented as separate interfaces or as a combined interface.

Figure 6:
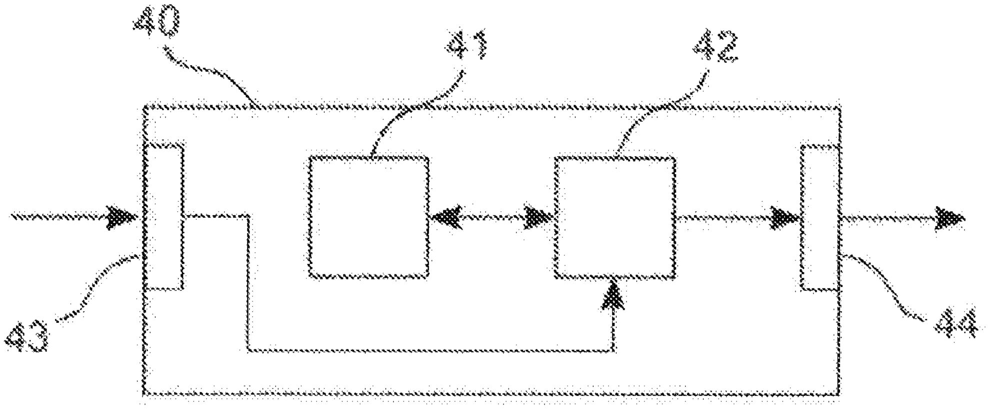
FIG. 6 schematically shows a second embodiment of a device for reducing masking by a virtual image of a head-up display of a transport.

FIG. 6 shows a simplified schematic illustration of a second embodiment of a device 40 for reducing masking by a virtual image of a head-up display of a transport. The device 40 has a processor 42 and a memory 41. For example, the device 40 is a controller or an embedded system. Stored in the memory 41 are instructions which, when executed by the processor 42, cause the device 40 to carry out the steps according to one of the methods described. The instructions stored in the memory 41 thus embody a program which is executable by the processor 42 and which realizes the method according to the disclosure. The device 40 has an input 43 for receiving information. Data generated by the processor 42 are provided via an output 44. Furthermore, the data may be stored in the memory 41. The input 43 and the output 44 can be combined to form a bidirectional interface.

The processor 42 may comprise one or more processor units, for example microprocessors, digital signal processors, or combinations thereof.

The memories 37, 41 of the described devices may have both volatile and nonvolatile memory areas and may comprise a wide variety of storage devices and storage media, for example hard disks, optical storage media, or semiconductor memories.

Figure 7:
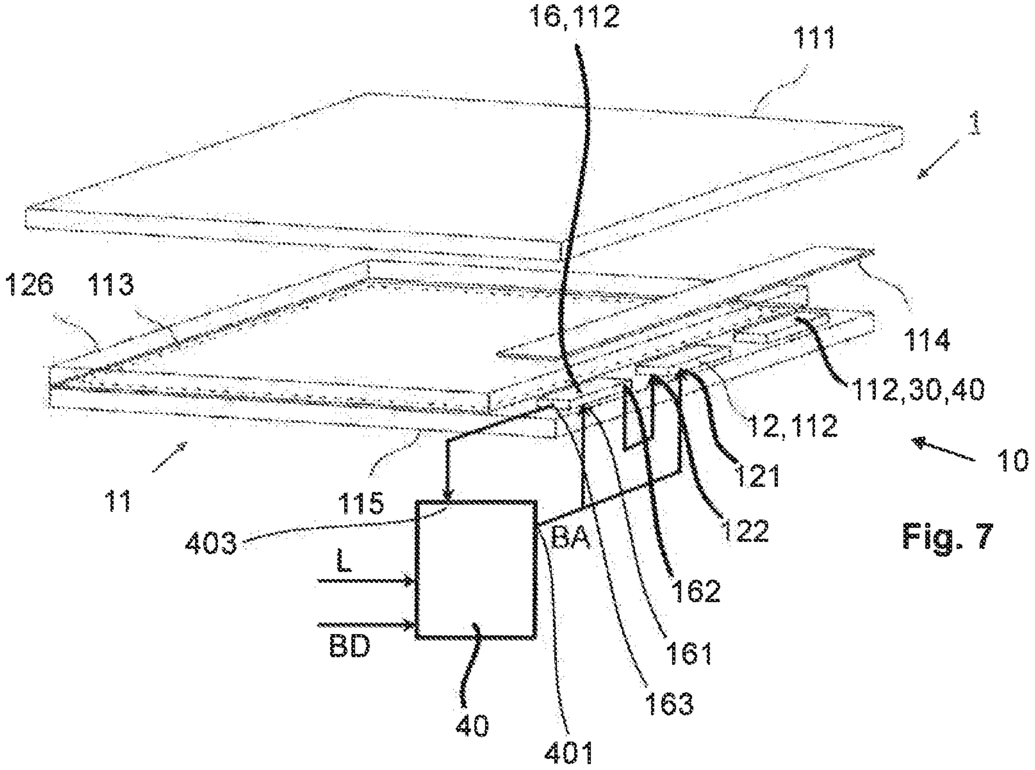
FIG. 7 shows the arrangement of a device for reducing masking by a virtual image of a head-up display of a transport on the display element thereof.

FIG. 7 shows the arrangement of a device 30, 40 for reducing masking by a virtual image VB of a head-up display of a transport on the display element 11 thereof. What is shown is a perspective illustration of an embodiment of a display device 1 of a head-up display according to the disclosure with a plurality of electronic components 112, one of which is a driver 12. A thermally conductive element 114 is arranged above the electronic components 112. A perspective exploded drawing of the display device 1 is illustrated. The electronic components 112 in this embodiment are an image brightness monitoring unit 16, a driver 12 for the display element 11, and a device 30, 40 according to the disclosure, all three of which are arranged on a substrate 115 of the display element 11 in a manner adjoining an active area 113, which is illustrated here by dashes. A cover 126, the design and function of which depend on the type of display, is located on the active area 113. In the case of a liquid crystal display, the cover 126 is, for example, a color filter glass, and in the case of an OLED display, by contrast, it is a cover glass required for encapsulation. The active area 113 is typically slightly smaller than the cover 126. A cover glass 111 is provided above the display element 11. The thermally conductive element 114 here extends over the entire width of the display element 11 and consequently over all three components 112. Owing to the areal placement of a thermally conductive element 114 composed of a suitable material with a high thermal conductance, the heat input of the components 112 is distributed uniformly and the temperature thereat is reduced. The method according to the disclosure makes it possible to carry out the masking recognition and the masking reduction with so few method steps that the latter are implementable without any problems on one of the electronic components 112 arranged directly on the substrate 115 of the display element 11. Although the device 30, 40 provided as one of the components 112 is indicated here as an individual component 112, it is realized in combination with the image brightness monitoring unit 16 in a single component 112.

In the case of large and bright head-up displays that cover a large region of the driver's field of view, the problem of masking arises in addition to the problem of dazzling. What matters here is how is it possible to avoid a situation in which an important object such as, for example, a cyclist, a pedestrian, an animal, a soccer ball rolling onto the road, or the like is masked by a brightly luminous, in particular white, region in the virtual image of the head-up display and may therefore not be perceived by the driver. A general approach is to avoid relatively large regions that are luminous over the whole area on the LC display. In the case of such a region that is luminous over the whole area, the LC display is transparent in the corresponding region, and so the light from its backlighting is allowed through. The virtual image VB is constructed from thin lines, instead of using filled areas. Possible masking is thus reduced.

In order to monitor masking, the virtual image VB is decomposed into small rectangles, also called tiles, and they are then checked for their transparency. This should take into consideration the fact that the transparency thus checked is permitted to have a magnitude only one quarter that of the maximum permissible masking area, since the areally white (luminous) region could be divided exactly among four rectangles adjoining one another in the worst case. In order to implement in the head-up display an avoidance of masking for the purposes of functional safety, monitoring of the image transparency is required. This monitoring is usually implemented in a chip on the transmission path upstream of the display. On an interface to the display controller or else in the input region of the display controller, malfunctions may also occur. Furthermore, tracking of the position of an observer's eye (so-called eyetracking) in order to recognize the viewing direction is technically demanding.

One configuration of the disclosure provides for arranging the masking monitoring as far back as possible in the transmission chain and/or simplifying the concept for masking monitoring to such an extent that it may be realized without any problems on a component situated near the LC display. It is proposed to vary the height of the tiles, i.e. their extent in the vertical direction, over the area of the image to be represented. It is additionally proposed to implement the masking monitoring in the display controller, i.e. on a component arranged on the substrate 115, the display glass. In this case, complex eyetracking or the determination of a vanishing point is replaced by the assumption of a fixed horizon height. This is extended by the information of the height as a result of the eyebox adjustment, i.e. the vertical adaptation of the representation of the virtual image to the height of the position of the eye of the observer 3. Such a function is provided anyway for the head-up display and is effected for example by way of a mechanical adjustment of the curved mirror 22 by means of the mounting 221 thereof. In future vehicles having controllers for highly automated driving, it is expected that the vertical location of the horizon will be determined by the image processing used for highly automated driving. The mechanical eyebox adjustment may thus adapt the representation of the virtual image to the actual horizon particularly well. Consequently, only a dependence of the tile size on the vertical distance to the horizon is implemented. This simplifies an implementation on a component arranged near the active area 113 of the LC display, for example on a display timing controller (a control unit which controls inter alia the temporal sequence of the pixels represented on the LC display). The masking monitoring is arranged as far back as possible in the processing chain of the display controller. This ensures that as many potential influences as possible that might cause undesired masking are covered, for example including those which only occur in upstream processing steps of the display timing controller. Independently of that, influences that may cause undesired masking and occur on the interface between a graphics chip that provides the image B to be displayed and a display controller that controls the active area 113 of the LC display are monitored and recognized. Safety during operation of the head-up display is thus increased.

The invention claimed is:

1. A method for reducing masking by a virtual image of a head-up display of a transport, the method comprising:
   - subdividing an image to be displayed into a plurality of individual partial areas,
   - wherein the individual partial areas are rectangular and their vertical extent varies over the area of the image to be displayed;
   - determining masking areas for the individual partial areas; and
   - outputting a warning signal if one of the determined masking areas exceeds a permissible size for at least one of the partial areas,
   - wherein the horizon is a fixedly predefined horizontal line of the image data of the image to be displayed, and a vertical displacement of the entire image content to be represented is performed depending on a detected vertical eye position of an observe.

2. The method as claimed in claim 1, wherein when determining the masking areas, a transparency of the individual partial areas is considered as a measure of the masking area.

3. The method as claimed in claim 1, wherein before outputting a warning signal, checking is carried out to ascertain whether the one of the determined masking area exceeds a permissible size for two or more adjacent partial areas.

4. The method as claimed in claim 1, wherein the individual partial areas have a decreasing vertical extent from an edge region of the image to be displayed to a horizon.

5. The method as claimed in claim 4, wherein determining the horizon is carried out by determining an inclination of a means of transport.

6. The method as claimed in claim 4, wherein at least one measure for reducing the masking is implemented in response to the warning signal.

7. The method as claimed in claim 6, wherein a display of image elements in the region of the horizon is prevented.

8. A non-transitory computer readable media having stored thereon a computer program comprising instructions which, when executed by a computer, cause the computer to carry out steps for reducing masking by a virtual image of a head-up display of a transport, comprising:

subdividing an image to be displayed into a plurality of individual partial areas, wherein the individual partial areas are rectangular and their vertical extent varies over the area of the image to be displayed;

determining masking areas for the individual partial areas; and outputting a warning signal if one of the determined masking areas exceeds a permissible size for at least one of the partial areas, wherein the horizon is a fixedly predefined horizontal line of the image data of the image to be displayed, and a vertical displacement of the entire image content to be represented is performed depending on a detected vertical eye position of an observe.

9. A device for reducing masking by a virtual image of a head-up display of a transport, comprising:

a subdividing module for subdividing an image to be displayed into a plurality of individual partial areas, wherein the individual partial areas are rectangular and their vertical extent varies over the area of the image to be displayed;

a processing module for determining masking areas for the individual partial areas; and a warning module for outputting a warning signal if one of the determined masking areas exceeds a permissible size for at least one of the partial areas, wherein the horizon is a fixedly predefined horizontal line of the image data of the image to be displayed, and a vertical displacement of the entire image content to be represented is performed depending on a detected vertical eye position of an observe.

10. The device as claimed in claim 9, wherein the device is configured in a head-up display.

11. The device as claimed in claim 10, wherein the device is arranged on a substrate of a display element.

* * * * *